(No Model.) 2 Sheets—Sheet 1.
F. A. CLARK.
MEAT PRESS.
No. 492,781. Patented Mar. 7, 1893.
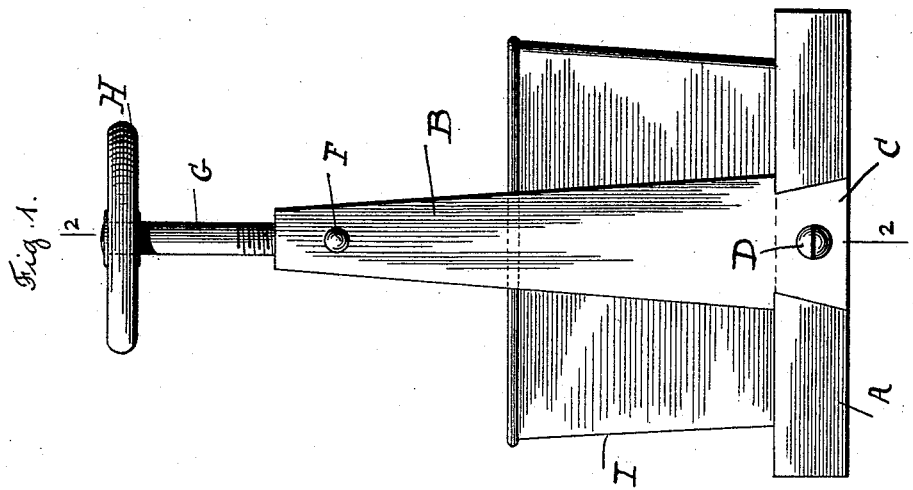
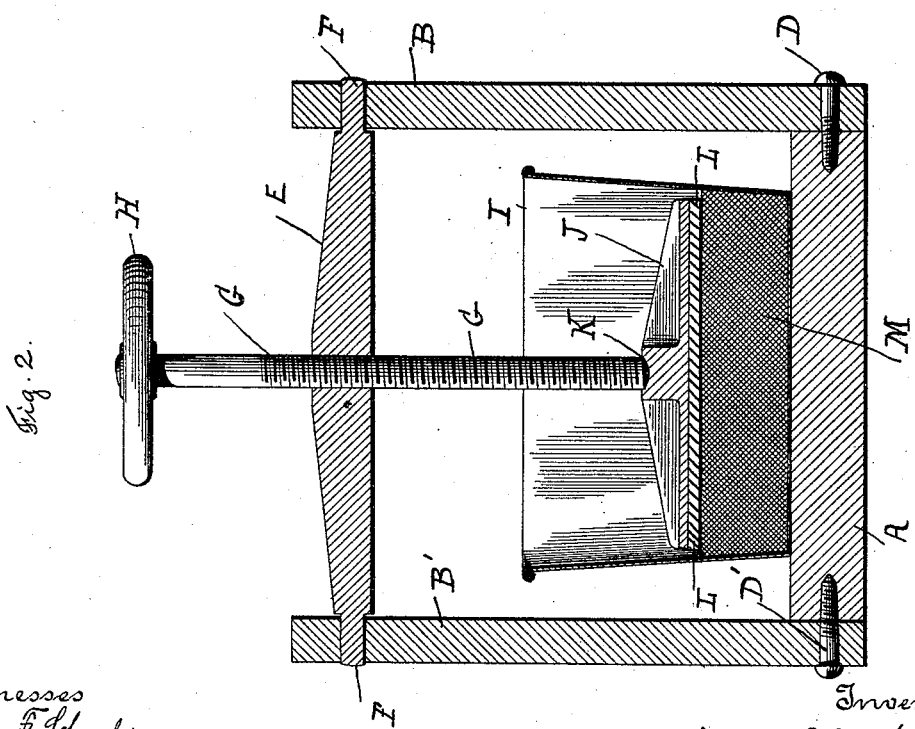
Witnesses
Chas. F. Schmelz
E. M. Healy
Inventor
F. A. Clark
By his Attorney
Louis W. Southgate (No Model.) 2 Sheets—Sheet 2.
F. A. CLARK.
MEAT PRESS.
No. 492,781. Patented Mar. 7, 1893.
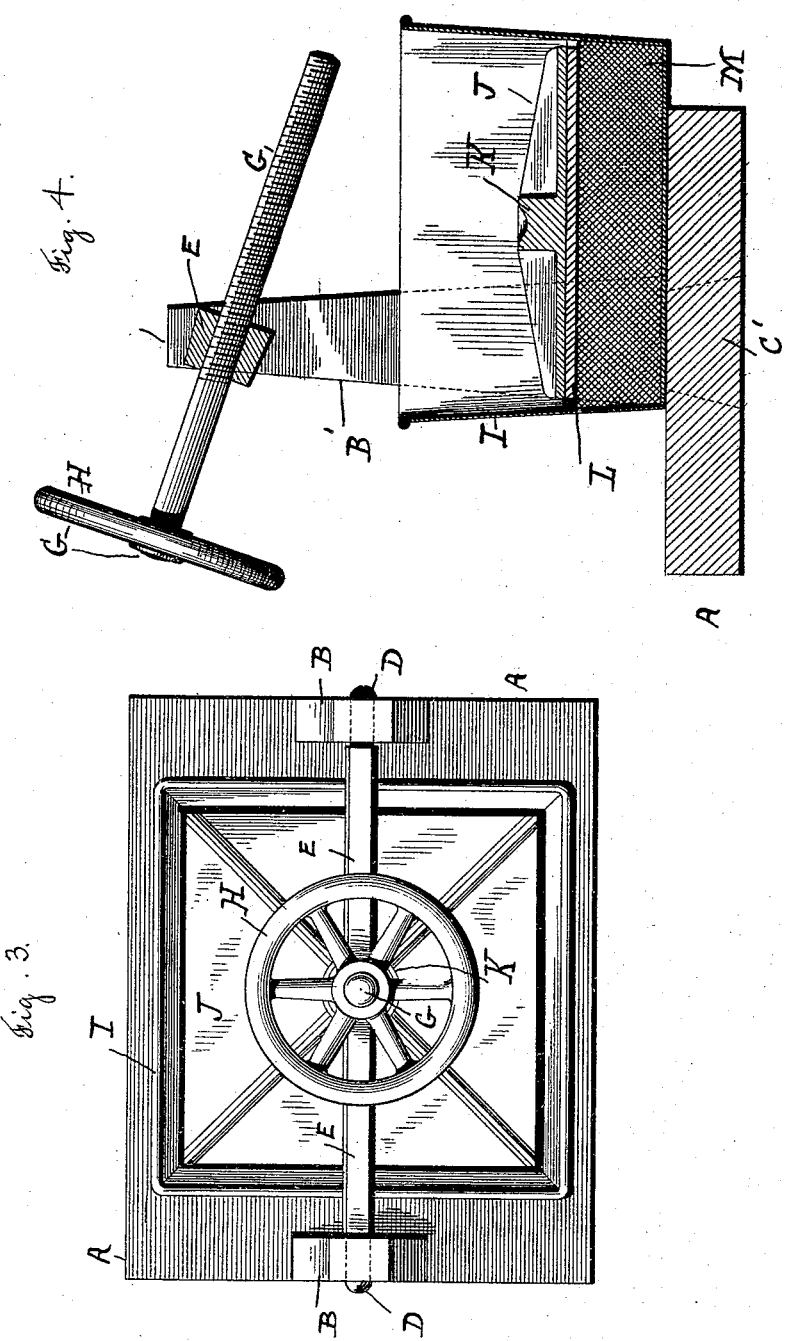

United States Patent Office.

FRANKLIN A. CLARK, OF WORCESTER, MASSACHUSETTS, ASSIGNOR TO HIMSELF AND GEORGE A. SANDERS, OF SAME PLACE.

MEAT-PRESS.

SPECIFICATION forming part of Letters Patent No. 492,781, dated March 7, 1893.

Application filed October 18, 1892. Serial No. 449,223. (No model.)

*To all whom it may concern:*

Be it known that I, FRANKLIN A. CLARK, a citizen of the United States, residing at Worcester, in the county of Worcester and State of Massachusetts, have invented a new and useful Improvement in Meat-Presses, of which the following is a specification.

The aim of this invention is to produce a new and improved hand-press, which may be used for pressing meat or other material, and the aim of the invention is to provide a device in which, after the material has been subjected to the desired degree of pressure, the material may be quickly removed.

To this end the invention consists of the device described and claimed in this specification, and illustrated in the accompanying two sheets of drawings, in which—

Figure 1 is a side elevation of my device. Fig. 2 is a sectional elevation on line 2—2 of Fig. 1. Fig. 3 is a plan, and Fig. 4 is a section at right-angles to Fig. 2, showing the manner in which the material to be pressed, is removed.

Referring to the drawings, and in detail, A represents a suitable base, and in this base are cut dove-tailed slots or mortises, in which are fitted the dove-tails or tenons C, C' of the uprights B, B', and these uprights are held in place in the base A by the screws D, D'. Before the uprights B, B' are secured to the base A, the bracket E, which has suitable pintles or bearings F on the end thereof, is fitted into the uprights B, B', as shown; the uprights B, B' having suitable holes to receive the journals F. Thus, it will be seen, that when the device or frame is secured together, as before described, a rigid structure is produced, and that the bracket E is free to turn on its journals F. A screw G is tapped into this bracket E, and this screw has a suitable handle H by which the same may be rotated. The material to be pressed is placed in a suitable pan I and on top of the material is then laid a platen J, which has a suitable boss K, in which the end of the screw G may rest, and this platen J is faced with any suitable material, as wood, as L, for the purpose of presenting a clean surface to the material to be pressed. When the platen is laid on the material to be pressed, in this manner, the end of the screw G is brought against the boss K, and the desired degree of pressure is imparted by means of the hand-wheel H. Now, in some operations, it is desired to instantly remove the material, after the same has been subjected to pressure, and this can be readily done in my device by slightly loosening the screw G, and then drawing the pan out, as shown in Fig. 4. The screw G and the bracket E being turned so that the screw G will clear the pan, as shown. This will save a good deal of time, as the screw G will not have to be run way up, so that the pan can be drawn out under the same, and this time is valuable in some processes, as for example, pressing meats for packing. Thus, it will be seen that the feature of the revolving bracket with the screw tapped therein, allows a very rapid and speedy withdrawal of the material, after the same has been subjected to pressure.

The details and arrangements of the parts herein shown and described may be greatly varied by a skilled mechanic without departing from the scope of my invention, as expressed in the claims.

Having thus fully described my invention, what I claim, and desire to secure by Letters Patent, is—

1. The combination in a device of the character described of the base A, the uprights B, B', having suitable dove-tails C, C', fitting in the base A, the bracket E having journals F fitted in the uprights B, B', the screw G, tapped in said bracket E, and having a hand-wheel H, and the platen J, with which the end of said screw is adapted to engage, substantially as described.

2. The combination in a device of the character described, of the framing, a bracket as E, journaled in said framing, a screw tapped in said framing, and a pan as I, adapted to be slid into the machine, a platen as J, adapted to fit into said pan, said screw G being adapted to be turned so that the end of the same can engage the platen J, and whereby said pan I can be removed by simply loosening the screw G, and turning the bracket E, substantially as described.

In testimony whereof I have hereunto set my hand in the presence of two subscribing witnesses.

FRANKLIN A. CLARK.

Witnesses:
 LOUIS W. SOUTHGATE,
 GEORGE A. SANDERS.